(12) United States Patent
Zheng et al.

(10) Patent No.: US 9,088,049 B2
(45) Date of Patent: Jul. 21, 2015

(54) BIFUNCTIONAL HOLLANDITE $AG_2MN_8O_{16}$ CATALYST FOR LITHIUM-AIR BATTERIES

(71) Applicant: Florida State University Research Foundation, Inc., Tallahassee, FL (US)

(72) Inventors: Jian-ping Zheng, Tallahassee, FL (US); Guoqing Zhang, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 196 days.

(21) Appl. No.: 13/748,323

(22) Filed: Jan. 23, 2013

(65) Prior Publication Data

US 2013/0216922 A1    Aug. 22, 2013

Related U.S. Application Data

(60) Provisional application No. 61/589,524, filed on Jan. 23, 2012.

(51) Int. Cl.
*H01M 4/90*    (2006.01)
*H01M 12/08*    (2006.01)
*C01G 45/12*    (2006.01)
*H01M 4/38*    (2006.01)

(52) U.S. Cl.
CPC ......... *H01M 4/9041* (2013.01); *C01G 45/1221* (2013.01); *H01M 4/9016* (2013.01); *H01M 12/08* (2013.01); *C01P 2002/72* (2013.01); *C01P 2004/03* (2013.01); *C01P 2004/04* (2013.01); *C01P 2004/32* (2013.01); *H01M 4/382* (2013.01); *Y02E 60/50* (2013.01)

(58) Field of Classification Search
CPC ........................... Y02E 60/122; H01M 4/9041
USPC .................................... 429/405, 528
See application file for complete search history.

(56) References Cited

U.S. PATENT DOCUMENTS

| | | | |
|---|---|---|---|
| 7,041,414 B2 * | 5/2006 | Thackeray et al. | 429/219 |
| 2005/0239948 A1 | 10/2005 | Haik et al. | |
| 2008/0176124 A1 * | 7/2008 | Imagawa et al. | 429/27 |
| 2010/0069228 A1 * | 3/2010 | Dopp et al. | |
| 2010/0143822 A1 * | 6/2010 | Zheng et al. | 429/483 |

OTHER PUBLICATIONS

Zhang, Guoqing, et al. "Preparation, Characterization and Electrochemical Catalytic Properties of Hollandite Ag2Mn8O16 for Lithium-Air Batteries." ECS Transactions 35.33 (2011): 43-46.*
Aleshin et al., "Protected anodes for lithium-air batteries," Solid State Ionics (2011) 184: 62-64.

(Continued)

*Primary Examiner* — Miriam Stagg
*Assistant Examiner* — Haroon S Sheikh
(74) *Attorney, Agent, or Firm* — Novak Druce Connolly Bove + Quigg LLP

(57) ABSTRACT

A lithium air battery cell includes an anode having lithium, a cathode having a $Ag_2Mn_8O_{16}$ catalyst, and an electrolyte comprising a lithium salt. A cathode for a lithium air battery cell and a lithium air battery with a cathode including buckypaper and a $Ag_2Mn_8O_{16}$ catalyst are also disclosed.

11 Claims, 10 Drawing Sheets

(56) References Cited

OTHER PUBLICATIONS

Andrei et al., "Some possible approaches for improving the energy density of Li-air batteries," J. Electrochem. Soc. (2010) 157: A1287-1295.

Cheng and Scott, "Carbon-supported manganese oxide nanocatalysts for rechargeable lithium-air batteries," J. Power Sources (2010) 195: 1370-1374.

Eswaran et al., "High capacity Li—O2 cell and electrochemical impedance spectroscopy study," Electrochem. Solid State Lett. (2010) 13: A121-A124.

Feng et al., "Alkali metal ions insertion/extraction reactions with hollandite-type manganese oxide in the aqueous phase," Chem Mater (1995) 7: 148-153.

Hummelshøj et al., "Communications: Elementary oxygen electrode reactions in the aprotic Li-air battery," The Journal of Chemical Physics (2010) 132: 071101.

Kichambare et al., "Electrochemical performance of highly mesoporous nitrogen doped carbon cathode in lithium-oxygen batteries," J. Power Sources (2010) 196: 3310-3316.

Laoire et al., "Influence of nonaqueous solvents on the electrochemistry of oxygen in the rechargeable lithium-air battery," J. Phys. Chem. C (2010) 114 (19): 9178-9186.

Lee et al., "Metal-Air electrochemical cells: Silver-polymer-carbon composite air electrodes," Electrochem. Solid State Lett (2010) 13: A162-A164.

Lu et al., "Electrocatalytic activity studies of select metal surfaces and implications in Li-air batteries," J. Electrochem. Soc. (2010) 157: A1016-A1025.

Marschilok et al., "Electrodes for nonaqueous oxygen reduction based upon conductive polymer-silver composites," J. Electrochem. Soc. (2011) 158: A223-A226.

Read et al., "Oxygen Transport Properties of Organic Electrolytes and Performance of Lithium/Oxygen Battery," J. Electrochem. Soc. (2003) 150: A1351-A1356.

Thapa and Ishihara, "Gold-palladium nanoparticles supported by mesoporous β-MnO2 air electrode for rechargeable Li-air battery," J. Power Sources (2012) 220: 211-216.

Xiao et al., "Optimization of air electrode for Li/Air batteries," J. Electrochem. Soc. (2010) 157: A487-A492.

Xu et al., "Investigation on the charging process of $Li_2O_2$-based air electrodes in Li—$O_2$ batteries with organic carbonate electrolytes", J. Power Sources (2011) 196: 3894-3899.

Zhang et al., "Lithium-air batteries using SWNT/CNF buckypapers as air electrodes," J. Electrochem. Soc. (2010) 157: A953-A956.

Zhang et al., "α-MnO2/buckypaper composite catalytic air electrodes for rechargeable lithium-air batteries," J. Electrochem. Soc. (2011) 158: A822A827.

Zhang and Read, "Partially fluorinated solvent as a co-solvent for the nonaqueous electrolyte of Li/air battery," J. Power Sources (2011) 196: 2867-2870.

Zhang et al., "A non-aqueous electrolyte for the operation of Li/air battery in ambient environment," J. Power Sources (2011) 196: 3906-3910.

Zhang et al., "A novel high energy rechargeable lithium/air battery," Chem. Commun. (2010) 46: 1661-1663.

Zheng et al., "The theoretical energy densities of dual-electrolytes rechargeable Li-air and Li-air flow batteries," J. Electrochem. Soc. (2011) 158: A43-A46.

Zheng et al., "The theoretical energy density of Li-Air batteries," J. Electrochem. Soc. (2008) 155(6): A432-A437.

* cited by examiner

BIFUNCTIONAL HOLLANDITE $Ag_2Mn_8O_{16}$ CATALYST FOR LITHIUM-AIR BATTERIES

CROSS-REFERENCE TO RELATED APPLICATION

This application claims priority to U.S. Provisional Patent Application 61/589,524, filed Jan. 23, 2012, entitled BIFUNCTIONAL HOLLANDITE $Ag_2Mn_8O_{16}$ CATALYST FOR LITHIUM-AIR BATTERIES, the entirety of which is incorporated herein by reference.

STATEMENT REGARDING FEDERALLY SPONSORED RESEARCH

This invention was made with government support under US Army CERDEC prime contract number: W15P7T-08-D-P416//DO 434002-80013 and subcontract/PO number: 10-1-228. The government has certain rights in this invention.

FIELD OF THE INVENTION

The invention relates generally to lithium-air batteries, and more particularly to catalysts for use with lithium air batteries.

BACKGROUND OF THE TECHNOLOGY

As a possible battery for diverse applications due to its high energy density, the lithium-air battery has been recently capturing increasing worldwide attention. The most important component involved in this battery system is the air diffusion electrode. The properties of the air electrode determine directly the performance of the whole battery. The significant variables of the air electrode, which are critical for its properties, include the surface area, porosity, thickness, catalysts, conductivity as well as polarity for various organic electrolytes. Among these factors, catalysts for oxygen electrochemical reduction not only enhance the discharge properties of the lithium-air battery, but also reduce overvoltage during the discharge. Therefore, energy and power densities are improved.

The oxygen electrochemical reduction mechanisms for lithium-air batteries in non-aqueous liquid electrolyte is a mixed reaction mechanism, which involves a one-electron oxygen reduction reaction $Li^+ + O_2 + e^- \rightarrow LiO_2$, two two-electron oxygen reduction reactions $2Li^+ O_2 + 2e^- \rightarrow Li_2O_2$ and $Li_2O_2 + 2Li^+ + 2e^- \rightarrow 2Li_2O$, as well as a chemical transfer reaction $2LiO_2 \rightarrow Li_2O_2 + O_2$. Lithium-air batteries operated in a different electrolyte may involve a different reaction process; and even for batteries operated under the same conditions the reaction process may depend on the setup voltage. Such complexities of the oxygen electrochemical reduction reaction in the lithium-air battery lead to some uncertainty in the selection of air electrode materials, electrolytes including solvents and conductive support salts. Although the non-aqueous lithium-air battery offers the exciting possibility of substantially higher capacity, much work remains to be done in order to improve its performance, such as lowering the discharge overvoltage and discharge capacity, the low practical energy density, low power density, poor cyclability, and (air) humidity issue (anode stability).

The behavior of the lithium-air battery involves the oxygen reduction reaction dynamics itself and active species diffusion, i.e., diffusion of oxygen from outside into inside of the air electrode, and movement of the anode reaction product $Li^+$ ions from the anode surface to the air electrode through the electrolyte. The diffusion of active species is related to the physical characteristics of the air electrode and electrolyte. To improve the capacity of the lithium-air battery, various approaches have been reported, for example the use of a bi-layer carbon electrode consisting of an active layer and a diffusion layer, different carbon materials, transition metal platinum and gold particles loaded onto the carbon, polymer-metal composites, different conductive electrolytes, as well as protected anode and catalyst materials. The intrinsic reaction of oxygen reduction was generally accelerated by the use of catalysts.

Carbon nanotube and nanofiber film-based materials, sometimes referred to as "Buckypaper," are known for use in polymer exchange membrane fuel cells (PEMFCs) because carbon nanomaterials typically exhibit high conductivity and large specific areas, relatively low microporosity and good resistance to electrochemical corrosion. The use of such materials in membrane electrode assemblies of fuel cells is described in U.S. Patent Application Publication US 2010/0143822 published Jun. 10, 2010, the disclosure of which is incorporated fully by reference. See also J. P. Zheng, R. Y. Liang, M. Hendrickson, and E. J. Plichta, *J. Electrochem. Soc.* 155, A432-A437 (2008) and J. P. Zheng, P. Andrei, M. Hendrickson, and E. J. Plichta, *J. Electrochem. Soc.* 158, A43 (2011), the disclosures of which are incorporated by reference.

SUMMARY OF THE INVENTION

A lithium air battery cell includes an anode comprising lithium, a cathode comprising a $Ag_2Mn_8O_{16}$ catalyst, and an electrolyte comprising a lithium salt. The $Ag_2Mn_8O_{16}$ particles can be between 2-100 nm in diameter. The loading of the $Ag_2Mn_8O_{16}$ catalyst can be between 5% and 75%.

The cathode can comprise at least one selected from the group consisting of single-wall carbon nanotubes, multi-wall carbon nanotubes, and carbon nanofibers. The cathode can comprise at least one selected from the group consisting of carbon black, carbon microbeads, and activated carbon. The cathode can comprise small and large diameter multi-wall nanotubes. The cathode can comprise an entanglement of flexible single-wall nanotubes and small diameter multi-wall nanotubes around nanofibers and the large diameter multi-wall nanotubes.

The electrolyte can comprise at least one selected from the group consisting of lithium hexafluorophosphate, lithium tetrafluoroborate, lithium hexafluoroarsenate, lithium perchlorate, lithium bis(trifluorosulfonyl) imide, lithium bis(perfluoroethylsulfonyl) imide, lithium triflate, lithium bis(oxalato) borate, lithium tris(pentafluoroethyl)trifluorphosphate, lithium bromide, and lithium iodide. The electrolyte can comprise at least one selected from the group consisting of propylene carbonate, ethylene carbonate, dimethyl carbonate, diethyl carbonate, ethylene carbonate, 1,2 dimethoxyethane, diethyl carbonate, ethyl methyl carbonate, gamma-butyrolactone, sulfolane, 1,3-dioxolane, tetrahydrofuran, dimethoxyethane, diglyme, tetraglyme, diethyl ether, 2-methyl tetrahydrofuran, tetrahydropyran, pyridine, n-methylpyrrolidone, dimethyl sulfone, ethyl methyl sulfone, ethyl acetate, dimethyl formamide, dimethyl sulfoxide, acetonitrile, and methyl formate.

The anode lithium can be at least one selected from the group consisting of from lithium metal, lithium powder, a lithium metal based alloy, a lithium intercalation compound and lithium titanate.

A cathode for a lithium air battery cell can include a cathode support, and a $Ag_2Mn_8O_{16}$ catalyst on the support. A lithium air battery cell can have a cathode comprising buckypaper and a $Ag_2Mn_8O_{16}$ catalyst, an electrolyte comprising a lithium salt, and an anode comprising lithium.

BRIEF DESCRIPTION OF THE DRAWINGS

The drawings appended hereto are intended to illustrate contemplated embodiments of the invention. The drawings are not intended to limit the invention solely to the embodiments illustrated and described.

DETAILED DESCRIPTION OF THE INVENTION

The invention comprises $Ag_2Mn_8O_{16}$ as an electrochemical catalyst for oxygen reduction in lithium-air batteries. The $Ag_2Mn_8O_{16}$ can be provided as particles that are dispersed on the cathode material. The particle is in a typical size between 2-100 nm and is substantially uniformly distributed in the air electrode. The diameter of the particle should be not less than the size of several crystallite unit cells such as around 2 nm. However, the catalytic rate is proportional to the surface area of the catalyst; therefore, the particle size should not be too large such as more than 100 nm in order to reduce the loading of catalyst. The catalytic rate usually increases with increasing the loading of the catalyst; however, the weight of electrode also increases with increasing the loading of the catalyst, and the electrical resistance also increases with increasing the loading of the catalyst since the catalyst is an insulating material. The amount of $Ag_2Mn_8O_{16}$ that is provided can vary. The loading of catalyst may vary from 5% to 75%. If the catalyst loading is too small, for example less than 5%, the increase of the catalytic rate would not be significant enough to affect cell performance. If the catalyst loading is too large, for example greater than 75%, the electrically conductive carbon cannot effectively form a conductive path, and the electrical resistance of the air electrode would be high and the voltage drop of the cell would be large due to the high ohmic resistance. The catalytic particle can be in different shapes such as nano-powder, nano-wire, nano-belt, and nanotube.

Figure 1:
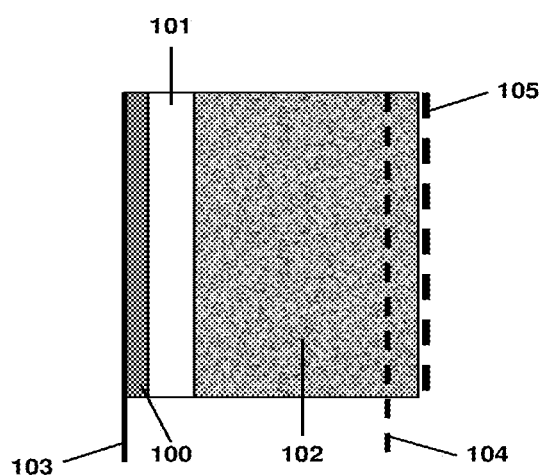
FIG. 1 is a schematic diagram of a lithium air cell.

A schematic illustration of a lithium air battery cell is shown in FIG. 1. The cell can have a lithium comprising anode electrode 100. Porous separator paper 101 can be provided. A gas permeable support such as a porous carbon is provided as cathode (air) electrode 102. A current collector (foil) 103 is provided for the anode electrode. A current collector with mesh 104 can form the cathode (air). The metal mesh allows oxygen flow. A porous paper 105 such as Teflon paper can be provided to prevent the electrolyte leaking out from the cathode (air) electrode but allows oxygen to flow into the cathode electrode. The battery (anode, cathode and separator) is filled with the electrolyte. Other lithium air battery cell designs are possible and within the scope of the invention.

The electrolyte is non-aqueous to avoid the deleterious effects that water has on lithium. The electrolyte contains one or more lithium salts. Examples of lithium salts for lithium air batteries are lithium hexafluorophosphate, lithium tetrafluoroborate, lithium hexafluoroarsenate, lithium perchlorate, lithium bis(trifluorosulfonyl) imide, lithium bis(perfluoroethylsulfonyl) imide, lithium triflate, lithium bis(oxalato) borate, lithium tris(pentafluoroethyl)trifluorphosphate, lithium bromide, and lithium iodide. Other lithium salts are possible.

The lithium salt is dissolved in a suitable solvent. Examples of suitable solvents for lithium salts include many known for lithium ion batteries such as propylene carbonate, ethylene carbonate, dimethyl carbonate, diethyl carbonate, ethylene carbonate, 1,2 dimethoxyethane, diethyl carbonate, ethyl methyl carbonate, gamma-butyrolactone, sulfolane, 1,3-dioxolane, tetrahydrofuran, dimethoxyethane, diglyme, tetraglyme, diethyl ether, 2-methyl tetrahydrofuran, tetrahydropyran, pyridine, n-methylpyrrolidone, dimethyl sulfone, ethyl methyl sulfone, ethyl acetate, dimethyl formamide, dimethyl sulfoxide, acetonitrile, and methyl formate. Other suitable solvents are possible.

In one embodiment the electrolyte is 1M $LiPF_6$ (Sigma Aldrich, 99.99%) in propylene carbonate (PC) (Sigma Aldrich, anhydrous 99.97%)/tetrahydrofuran (THF) (Sigma Aldrich, anhydrous 99.99%).

The lithium anode can be made from any suitable materials and according to different designs. The lithium anode can for example be made from lithium metal, lithium powder, a lithium metal based alloy, a lithium intercalation compound or lithium titanate.

The cathode electrode must have the following two characteristics: (1) electrically conductive to allow current flow, (2) porous to allow gas (oxygen) diffusion and to be filled with electrolyte to allow lithium-ion diffusion. Carbon is the best candidate for cathode electrodes. It can be in different forms including carbon black, carbon microbeads, activated carbon, carbon fiber, carbon nanotube, and mixtures thereof.

The invention in one aspect utilizes a material for the air electrode that is a composite of nanotubes and nanofibers, known as "buckypaper". This material is desirable for high electrical conductivity, large surface area without micropores, high resistance to corrosion, controllable microstructure and maximum three-phase area surface morphology. As used herein, "buckypaper" is used to refer to a film-like, stable composite comprising a web of single-wall carbon nanotubes, muti-wall carbon nanotubes, carbon nanofibers, or a combination thereof. In the embodiments disclosed herein, the buckpaper can be stabilized largely by entanglement of flexible single-wall nanotubes and small diameter multi-wall nanotubes around larger, more rigid nanofibers and the large diameter multi-wall nanotubes.

As used herein, the terms "carbon nanotube" and the shorthand "nanotube" refer to carbon fullerene structures having a generally cylindrical shape and typically having a molecular weight ranging from about 840 to greater than 10 million Daltons. Carbon nanotubes are commercially available, for example, from Carbon Nanotechnologies, Inc. (Houston, Tex. USA), or can be made using techniques known in the art. As used herein, the term "small diameter MWNT" refers to multiwall nanotubes having a diameter of 10 nm or less, and the term "large diameter MWNT" refers to multiwall nanotubes having a diameter of more than 10 nm. The term "large diameter CNF" refers to carbon nanofibers having a diameter of 10 nm or more. As used herein, the terms "carbon nanofilament" and "nanofilament" are used interchangeably to describe single-wall carbon nanotubes, multi-wall carbon nanotubes and carbon nanofibers.

Single-wall nanotubes can have a diameter of about 1-10 nanometers and a length between 100-1000 nanometers. Multi-wall nanotubes are multi-wall nanotube structures and can have a diameter ranging from less than 2 nanometers to 10 nanometers and a length between 100 nanometers and 500 micrometers. Carbon nanofibers can have a diameter from 20 nanometers to 200 nanometers and a length from 10 to 100 micrometers.

Figure 2:
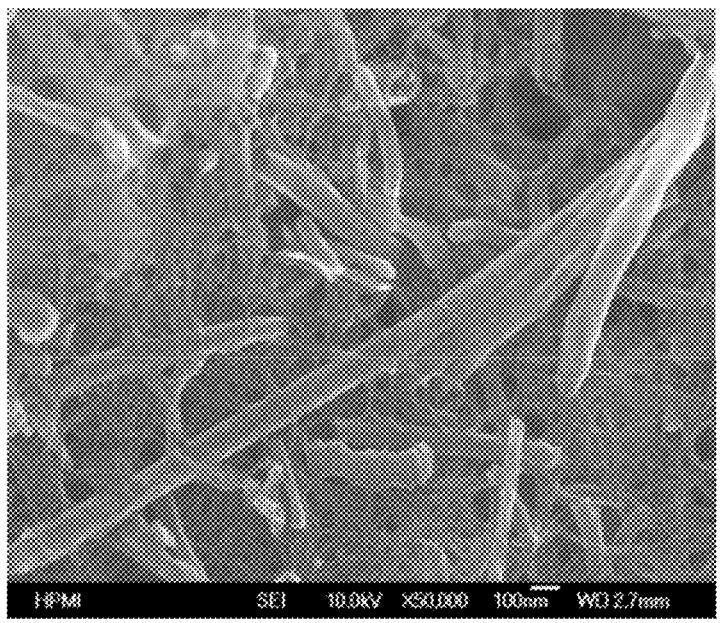
FIG. 2 is a scanning electron microscope (SEM) image of the surface morphology of buckypaper made with SWNT with CNF at a weight ratio of 1:3.
Figure 3:
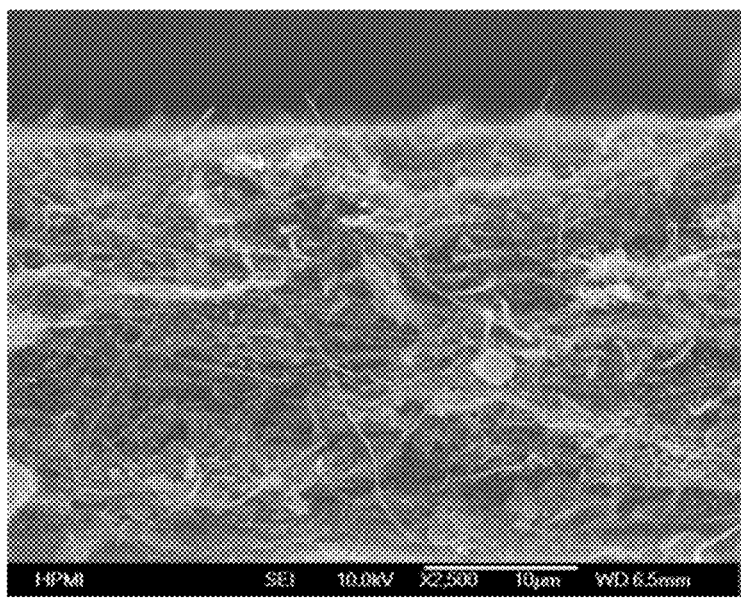
FIG. 3 is a SEM image of the cross sectional morphology.

The buckypaper can include at least two types of nanofilaments selected from single-wall nanotubes, small diameter multi-wall carbon nanotubes, large diameter multi-wall carbon nanotubes, and carbon nanofibers. The buckypaper used in the catalyst layer can include (a) single-wall nanotubes, small diameter multi-wall nanotubes, or both, and (b) large diameter multi-wall nanotubes, carbon nanofibers, or both. FIG. 2 is an image showing the surface morphology of buckypaper. FIG. 3 is an image depicting the cross-section morphology of buckypaper.

The ratio of the nanofilaments of (a) to the nanofilaments of (b) can range from 1:2 to 1:20. In some embodiments, the ratio of (a) to (b) can range from 1:2 to 1:15, or 1:2.25 to 1:8, or from 1:2.5 to 1:6. The buckypaper can also be made without any SWNT. For example with MWNT/CNF ratio in such buckypaper can be 1:1 to 1:10.

The buckypaper can include at least a first layer and a second layer. The first and second layers can be the same or different. The first layer can include (a) single-wall nanotubes, small diameter multi-wall nanotubes, or both, and (b) large diameter multi-wall nanotubes, carbon nanofibers, or both, and the second layer can include multi-wall nanotubes, carbon nanofibers, or both. The buckypaper microstructure can be tailored by adjusting the starting materials and nanotube dispersion to achieve a target porosity, pore size, surface area and electrical conductivity. The catalyst layer can be formed by depositing a plurality of catalyst nanoparticles on the buckypaper after the buckypaper has been formed. By depositing the catalyst nanoparticles after the buckypaper is formed, the catalyst nanoparticles can be directly deposited at the most efficient sites on the buckypaper for maximizing the three-phase reaction coefficient.

The buckypaper can be fabricated using the steps of (1) dispersing an amount of MWNT's, CNFs, or both MWNTs and CNFs, with an amount of SWNTs in a liquid to form a suspension (wherein the nanotubes separate into individual fibers or small bundles and float in the non-solvent due to the large surface area of the nanotubes and strong molecular interactions); and then (2) filtering the suspension to remove the liquid, to yield a film that includes MWNTs, CNFs, or both MWNTs and CNFs, with SWNTs interspersed therethrough. In another embodiment, step (2) utilizes vaporization of the liquid to remove the liquid and form the buckypaper. It is also possible to use a combination of filtration and evaporation, either sequentially or simultaneously. The vaporization or filtration process may include the addition of heat, a pressure reduction, or a combination thereof. The catalyst nanoparticle can also be integrated into the catalytic electrode during buckypaper formation by mixing catalytic materials with a designed amount of carbon materials in a liquid to form a suspension.

The liquid can be a non-solvent. As used herein, the term "non-solvent" refers to any liquid media that essentially are non-reactive with the nanotubes and in which the nanotubes are virtually insoluble. Examples of suitable non-solvent liquid media include water and volatile organic liquids, such as acetone, ethanol, methanol, and n-hexane. The liquid may be an aqueous solution, and may be an aqueous-organic liquid mixture. Low-boiling point non-solvents are typically preferred so that the nonsolvent can be easily and quickly removed from the matrix material. The liquid optionally may include a surfactant (such as a non-ionic surfactant, e.g., Triton X-100, Fisher Scientific Company, NJ) to enhance dispersion and suspension stabilization. The surfactant can be removed along with the rest of the liquid in the filtration or volatilization step.

In one embodiment, the method used to produce the buckypaper can also include aligning the nanotubes in the buckypaper. The liquid removal may be performed following alignment of the nanotubes in the suspension, such that the alignment is substantially maintained after the liquid is removed. In one embodiment, this alignment may be performed using in situ filtration of the SWNT/suspensions in high strength magnetic fields, as described for example, in U.S. Patent Application Publication No. 2005/0239948 to Haik et al., which is incorporated herein by reference.

In another aspect, the buckypaper can include multiwall nanotubes and/or carbon nanofibers entangled with a small amount of single wall nanotubes. In one embodiment, the buckypaper can include MWNTs, CNFs, or a mixture thereof; and SWNTs entangled among the MWNTs, CNFs, or mixtures thereof, wherein the buckypaper is between 5 wt % and 50 wt % SWNTs. In another embodiment, a buckypaper is provided that includes large diameter MWNTs, CNFs, or a mixture thereof, and small diameter MWNTs entangled among the large diameter MWNTs, large diameter CNFs, or mixtures thereof wherein the film is between 5 wt % and 50 wt % small diameter MWNTs. The buckypaper is of sufficiently large length and width dimensions to be useful in the applications disclosed herein.

The buckypaper can be used to form at least the cathode of a lithium air battery cell. One or more catalysts known for lithium air cells can be loaded onto the buckypaper. The catalyst layer can be formed by depositing a plurality of catalyst nanoparticles on the buckypaper after the buckypaper has been formed. The catalyst can also be integrated into the catalytic electrode during buckypaper formation by mixing catalytic materials with a designed amount of carbon materials in a liquid to form a suspension. Buckypaper has been used in Li-air cells with and without catalysts. The paper (G. Q. Zhang, R. Y. Liang, J. P. Zheng, M. Hendrickson, and E. J. Plichta, "Lithium-air Batteries Using SWNT/CNF Buckypapers as Air Electrodes" *J. Electrochem. Soc.* 157, A953 (2010)) has demonstrated that buckypaper could be an effective air electrode for Li-air batteries for high specific capacity. The paper also showed the relationship between the thickness of the buckypaper and specific capacity, and the current density and specific capacity. Another paper (G. Q. Zhang, J. P.

Zheng, R. Liang, C. Zhang, B. Wang, M. Au, M. Hendrickson, and E. J. Plichta, "α-$MnO_2$/Buckypaper Composite Catalytic Air Electrodes for Rechargeable Lithium-air Batteries", *J. Electrochem. Soc.* 158 A822 (2011)) has demonstrated that the cyclability of Li-air batteries could be improved by using composite CNT/CNF/$MnO_2$ buckypaper air electrodes. The disclosure of these references is incorporated fully by reference.

EXAMPLE

Hollandite $Ag_2Mn_8O_{16}$ was prepared by a solid-state chemical method. The details of this process were as following: according to the chemical stoichiometric ratio, 2 mmol $AgNO_3$ (R.A, Sigma-Aldrich) was added to 4 mmol electrolytic $MnO_2$ (R.A, Sigma-Aldrich) to form a mixture, which was then ground with a pestle to form a uniform precursor while adding a few drops of anhydrous ethanol. The precursor was heat-treated at 400° C. for 12 h in an air atmosphere. After the heated precursor was allowed to cool to room temperature, the solid product was ground to a fine powder, which was used as a catalyst to prepare an air electrode for lithium-air batteries.

To fabricate the catalytic air electrode with $Ag_2Mn_8O_{16}$ used as an electrocatalyst, the $Ag_2Mn_8O_{16}$ was dispersed uniformly into 50 mL dimethylformamide (DMF) solvent by sonic shaking and then the suspension was added into a dimethylformamide suspension solution of single wall nanotubes (SWNT, Carbon Nanotechnologies Inc.) and carbon nanofibers (CNF, Applied Sciences Inc.) at a mixing ratio of 1:3 w/w. The mixture suspension was sonic shaken for 1 hr and then filtered to produce a $Ag_2Mn_8O_{16}$/SWNT/CNF composite. The diameter and length of the SWNT are 0.8-1.2 nm and 100-1000 nm, and for the CNF are 100-200 nm and 30-100 μm, respectively. The obtained $Ag_2Mn_8O_{16}$/SWNT/CNF composite was cut into an active size of 1.8 cm in diameter for the air electrode. No binder was used during the air electrode preparation. The mole ratio of $Ag_2Mn_8O_{16}$ to carbon in the air electrode was 0.33%. The thickness for the pristine (eg., without $Ag_2Mn_8O_{16}$) composite and $Ag_2Mn_8O_{16}$/SWNT/CNF composite was 290 μm and 300 μm, respectively.

The electrochemical performance measurement of the as prepared $Ag_2Mn_8O_{16}$/SWNT/CNF composite air electrode was conducted in a Li-air cell. The lithium-air cell was constructed in an argon atmosphere glove box by stacking a lithium (Li) foil (Sigma Aldrich, 99.9%, 0.38 mm thickness), a piece of glass fiber separator (18 mm×0.65 mm) and an air electrode (with and without the $Ag_2Mn_8O_{16}$ catalyst) in sequence into a electrochemical testing cell (ECC-AIR, provided by EL-CELL GmbH, Co, Germany), in which the upper diffusion type air electrode is contacted by, and "breathes" through the perforated stainless steel current collector (plate) on top. The gas volume inside the cell above the perforated plate was accessible via a port in the cell lid. The cell lid was equipped with two parts for gas inlet and outlet, so that the gas could be passed through a siphon along the backside of the air electrode. 0.5 mL non-aqueous electrolyte was filled into the assembled lithium-air cells. The non-aqueous electrolyte was made with 1M $LiPF_6$ (Sigma Aldrich, 99.99%) in propylene carbonate (PC) (Sigma Aldrich, anhydrous 99.97%)/tetrahydrofuran (THF) (Sigma Aldrich, anhydrous 99.99%) at a ratio of 1:1 by weight.

The phase identification of the prepared $Ag_2Mn_8O_{16}$ sample was conducted by analysis of an X-ray diffraction (XRD) pattern recorded using a $CuK_\alpha$ line from a Siemens D500 diffractometer. The surface and pore size distribution of the $Ag_2Mn_8O_{16}$/SWNT/CNF composite air electrode were measured using a surface analyzer (Micromeritics TriStar 3000, Micromeritics Inc., Norcross Ga.) with a nitrogen adsorption method. Discharge measurements were carried out in 1 atm oxygen or argon gas at room temperature using an Arbin Instruments (Arbin-010 MITS pro 4.0-BT2000) controlled by a computer. The morphologies of the $Ag_2Mn_8O_{16}$ and $Ag_2Mn_8O_{16}$/SWNT/CNF composite air electrode were observed using a scanning electron microscope (SEM, JSM-7401, JEOL, Peobody Mass.) and a transmission electron microscope (TEM, JEM-ARM200F).

Figure 4:
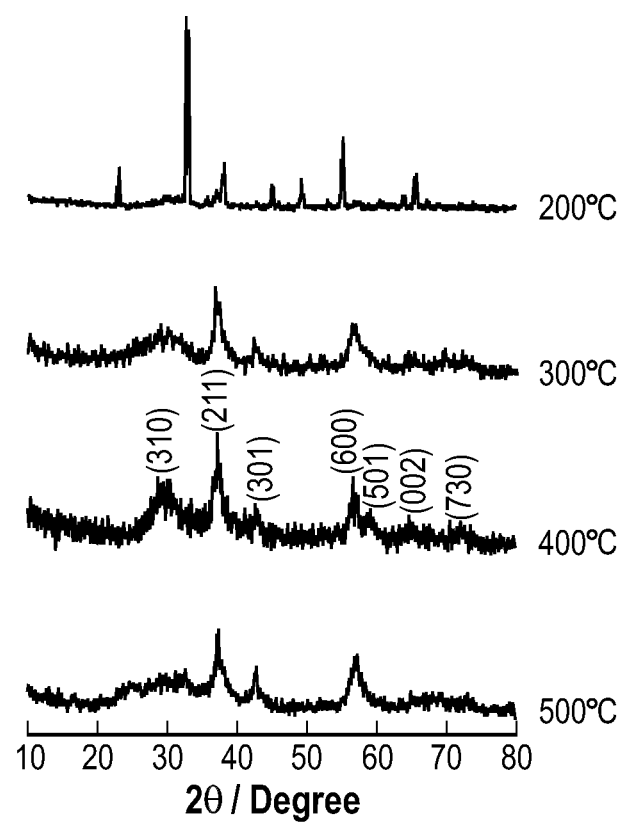
FIG. 4 is XRD patterns of the precursor pyrolyzed at 200, 300, 400 and 500° C.
Figure 5:
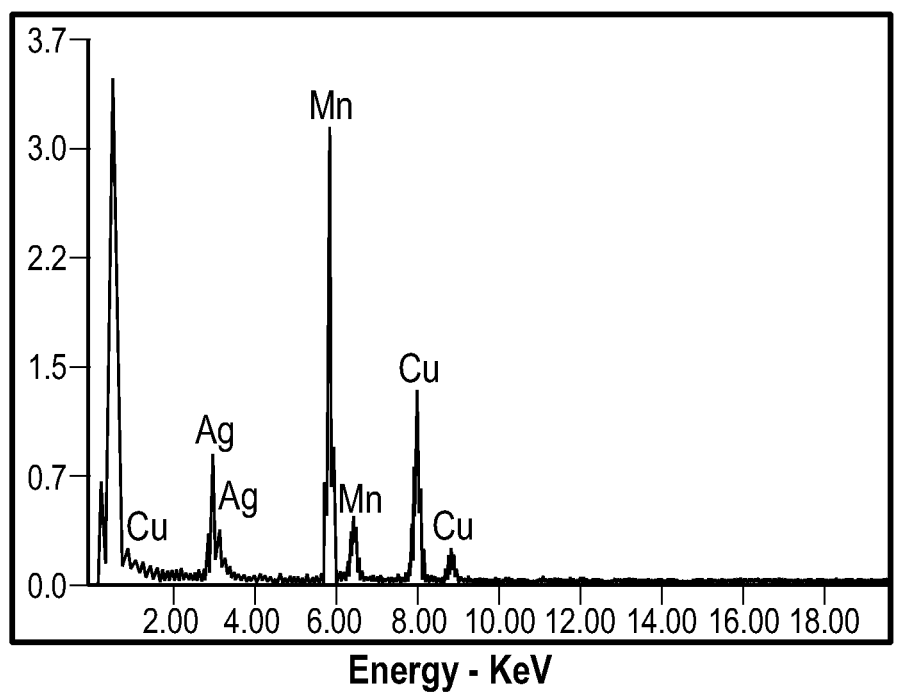
FIG. 5 illustrates energy dispersion spectrometer (EDS) analysis of $Ag_2Mn_8O_{16}$. The peaks corresponding to Cu were contributed by the substrate of the Cu grid.

XRD patterns of the precursor sample pyrolyzed at 200, 300, 400 and 500° C. ARE shown in FIG. 4. It can be seen that the changing of patterns clearly takes place as temperature increases. Below 200° C., the pattern exhibits typical diffraction peaks of $AgNO_3$ and $MnO_2$, displaying no chemistry reaction. When the pyrolyzing temperature reaches 300° C., the main peaks of raw reagents disappeared and new peaks appeared, as a new phase formed. When the precursor sample was pyrolyzed at 400° C., the pattern indicates well-defined reflections, which means the formation of crystalline structure of $Ag_2Mn_8O_{16}$. The diffractive peaks of $Ag_2Mn_8O_{16}$ were assigned as 28.9° (310), 37.5° (211), 41.9° (301), 56.5° (600), 57.0° (501), 65.0° (002) and 73.9° (730). All strong peaks in the XRD pattern can be indexed as a tetragonal phase of $Ag_2Mn_8O_{16}$ with a space group of 14/m(87) (JCPDS 29-1143). The pattern changes as the pyrolyzing temperature increases over 400° C., indicating no phase change. Therefore, the product obtained at 400° C. was used to inspect physical and electrochemical properties in this work. The composition of the product was analyzed by an energy dispersion spectrometer (EDS). The results are shown in FIG. 5. The EDS results confirm the existence of silver, manganese and oxide elements. Structural analysis further reveals that the $Ag_2Mn_8O_{16}$ prepared at 400° C. is composed of b-axis oriented crystals, which has the hollandite structure; all of the empty tunnels formed by the $MnO_6$ octahedral periodically sharing their edges and vertices are occupied by $Ag^+$. This type of manganese oxide is referred to generally as a molecular sieve, making it a particularly attractive for catalytic and ion exchange purposes.

Figure 6:
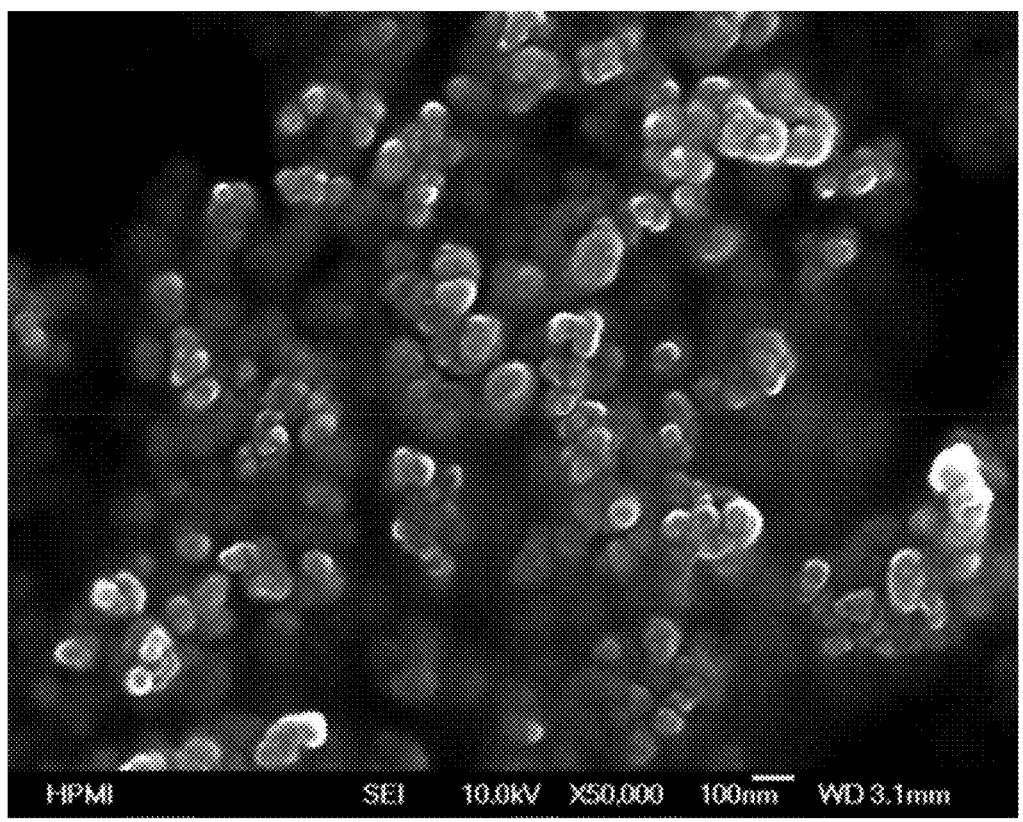
FIG. 6 is an SEM image of $Ag_2Mn_8O_{16}$.
Figure 7:
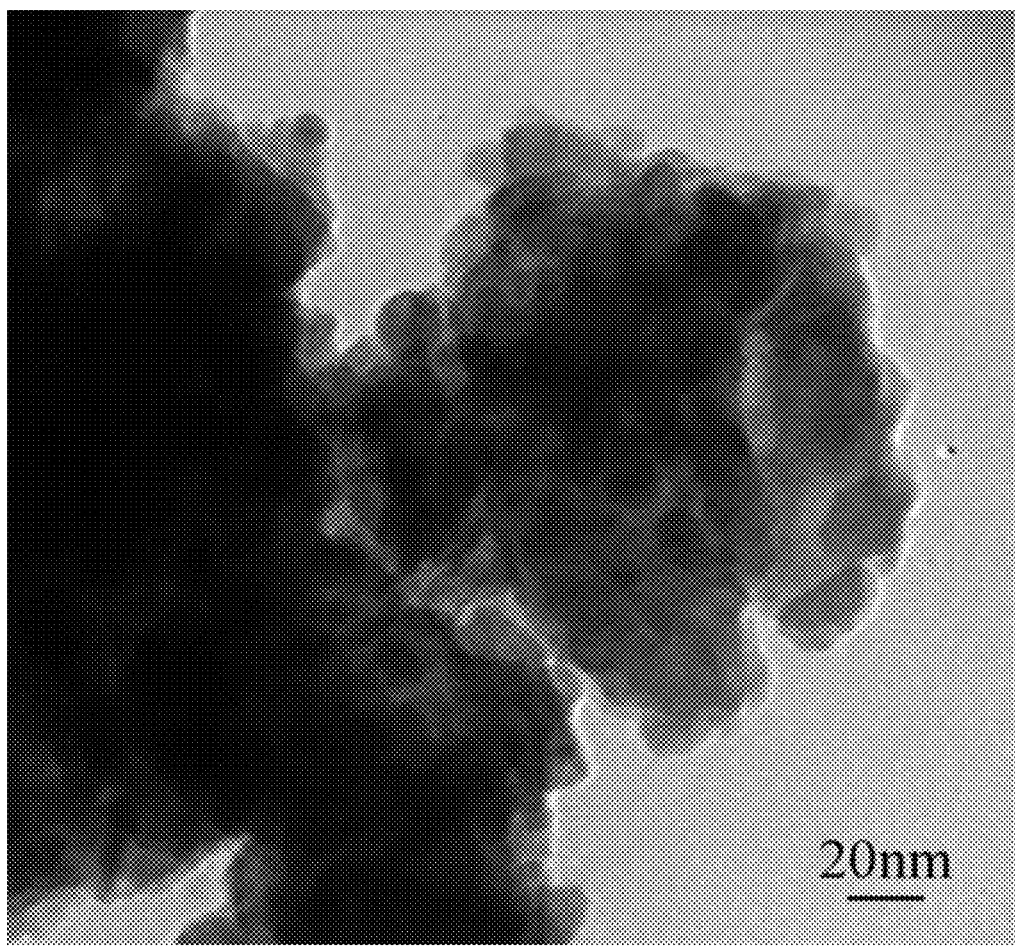
FIG. 7 is a selected area electron diffraction (SAED) image of $Ag_2Mn_8O_{16}$.
Figure 8:
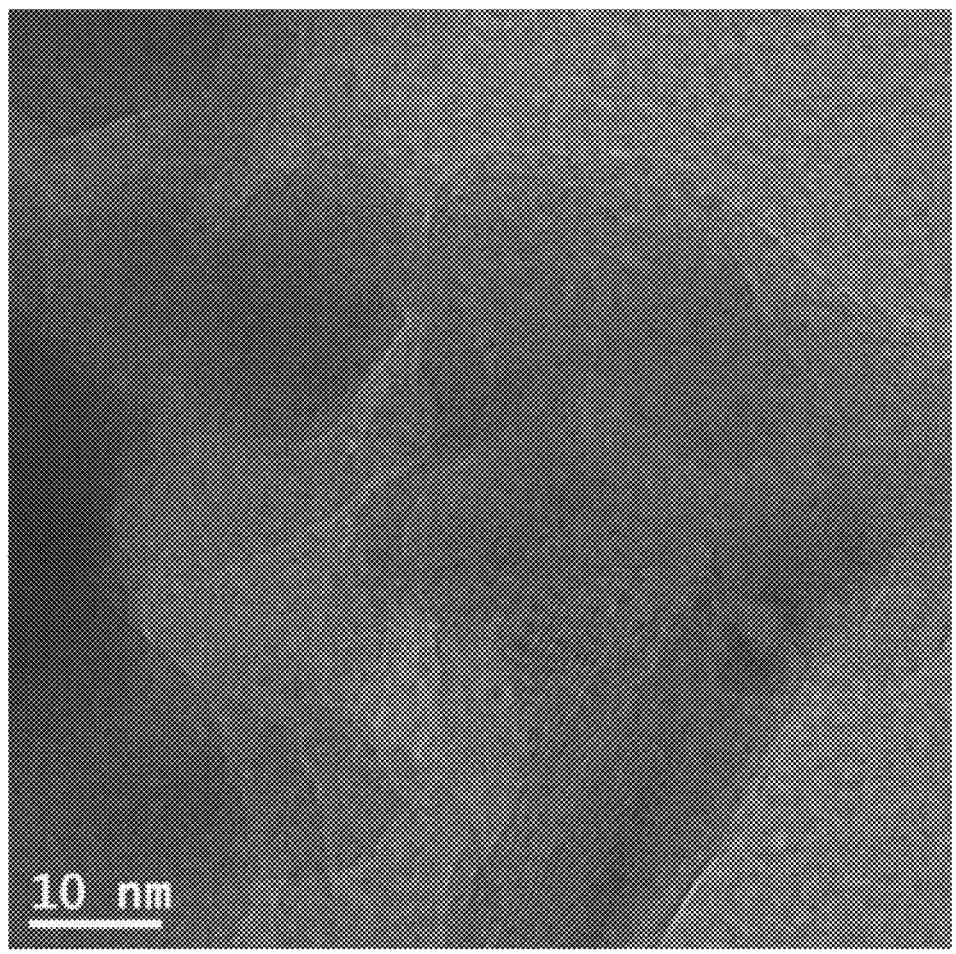
FIG. 8 is a high-resolution transmission electron microscopy (TEM) image of $Ag_2Mn_8O_{16}$.

As shown by the as-prepared $Ag_2Mn_8O_{16}$ SEM and TEM images in FIGS. 6-8, the prepared $Ag_2Mn_8O_{16}$ sample is mainly composed of spherical particles with diameters in the range of 10~100 nm (FIG. 6). The particles grouped together to form large spherical particles with diameter of about 200-500 nm. The selected area electron diffraction pattern (SAED) also confirmed the structure of $Ag_2Mn_8O_{16}$ (FIG. 7). In addition, the representative HRTEM image (FIG. 8) shows clear lattice distance that corresponds to the (211) crystal plane of the $Ag_2Mn_8O_{16}$ catalyst.

Figure 9:
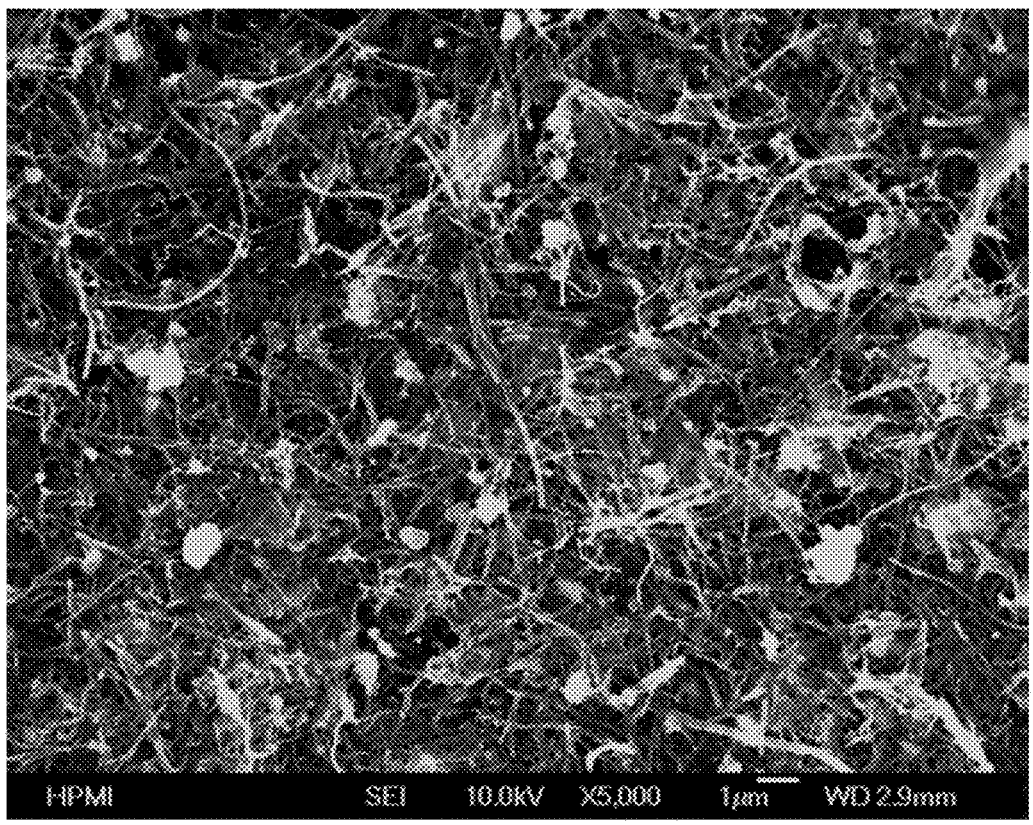
FIG. 9 is an SEM image of $Ag_2Mn_8O_{16}$/SWNT/CNF composite air electrode.

FIG. 9 is a SEM image of a $Ag_2Mn_8O_{16}$/SWNT/CNF composite air electrode. FIG. 9 illustrates the surface of $Ag_2Mn_8O_{16}$/SWNT/CNF electrode. It can be seen that the $Ag_2Mn_8O_{16}$ particles are well distributed into the entangled SWNT/CNF networks, which ensure the catalyst particles contact well to carbon substrate, and further enhance the electron conductive path.

Figure 10:
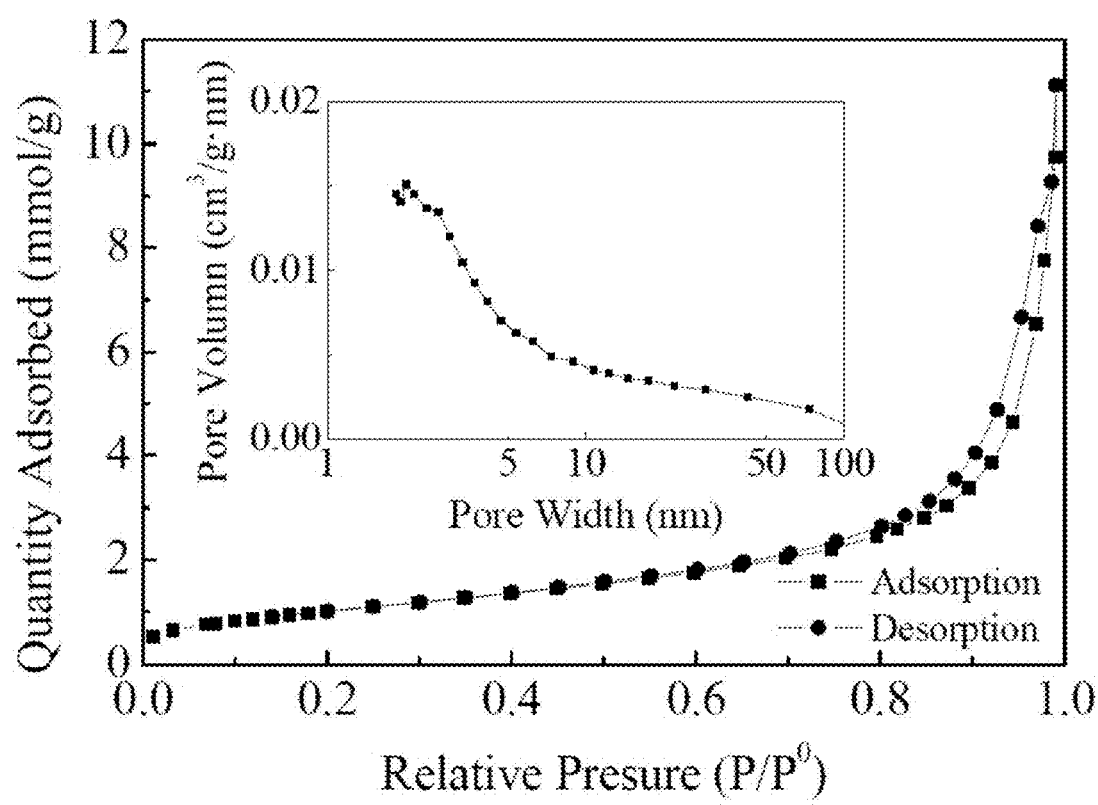
FIG. 10 illustrates $N_2$ adsorption (squares)-desorption (circles) isotherm curves measured on $Ag_2Mn_8O_{16}$/SWNT/CNF composite air electrode. The inset shows the corresponding BJH pore size distribution.

FIG. 10 is a graph of $N_2$ adsorption (squares)-desorption (circles) isotherm curves measured on $Ag_2Mn_8O_{16}$/SWNT/CNF composite air electrode. The inset shows the corresponding BJH pore size distribution. From experimental results, the BET surface area is 84 $m^2 \cdot g^{-1}$ for a $Ag_2Mn_8O_{16}$/SWNT/CNF composite air electrode. Compared to pristine SWNT/CNF paper, the BET surface area decreased from 173 $m^2 \cdot g^{-1}$ for pristine SWNT/CNF paper to 84 $m^2 \cdot g^{-1}$ for $Ag_2Mn_8O_{16}$/SWNT/CNF for the composite air electrode. This resulted from the accommodation of $Ag_2Mn_8O_{16}$ particles within the pores of SWNT/CNF paper. A sharp maximum appears at 2.5 nm in the pore size distribution curve (FIG. 10, inset), and the curve indicates the presence of mesopores of all diameters between 2 and 20 nm.

Figure 11:
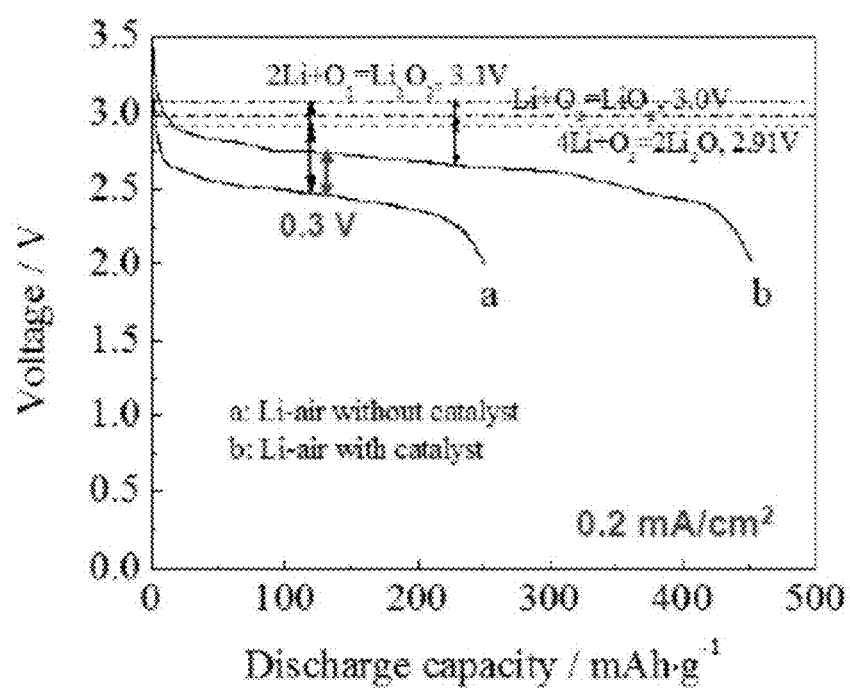
FIG. 11 illustrates discharge curves of Li-air cells with and without $Ag_2Mn_8O_{16}$ catalyst at a constant current density of 0.2 mA/cm$^2$ testing within oxygen.

FIG. 11 is a graph of discharge curves of lithium-air cells with and without $Ag_2Mn_8O_{16}$ catalyst at a constant current density of 0.2 mA-cm$^{-2}$ testing within oxygen. Discharge profiles at constant current of 0.2 mA-cm$^{-2}$ are given in FIG. 12 for lithium-air cells with and without $Ag_2Mn_8O_{16}$ catalyst. During cell discharge, the lithium anode is consumed by electrochemical conversion to Li ions and transfer into the electrolyte, and at the cathode, oxygen gas is electrochemically reduced to form lithium oxides. From FIG. 11, it can be seen that the cells are able to sustain the current drains, as demonstrated by the flat discharge curves. The open circuit potential of the lithium-air cell with a $Ag_2Mn_8O_{16}$ catalyst reached about 3.5 V. The cut-off voltage was 2.0 V. At a current drain of 0.2 mA-cm$^{-2}$ for the cell with $Ag_2Mn_8O_{16}$ electrocatalyst, the average voltage plateau was about 2.75 V, and the discharge lasted for 24.6 h yielding a discharge capacity of 420 mAh-g$^{-1}$. In comparison, the lithium-air cell without the catalyst displays a lower voltage plateau of 2.45 V and smaller discharge capacity of 250 mAh-g$^{-1}$. It is clear that the discharge voltage plateau of the lithium-air cell with the $Ag_2Mn_8O_{16}$ electrocatalyst was improved significantly; and the discharge time was prolonged thereby providing an increased discharge capacity. These results clearly demonstrated that the use of $Ag_2Mn_8O_{16}$ electrocatalyst in the cell can lower the polarization caused in discharge and consequently reduce the discharge overvoltage of the lithium-air cell.

Figure 12:
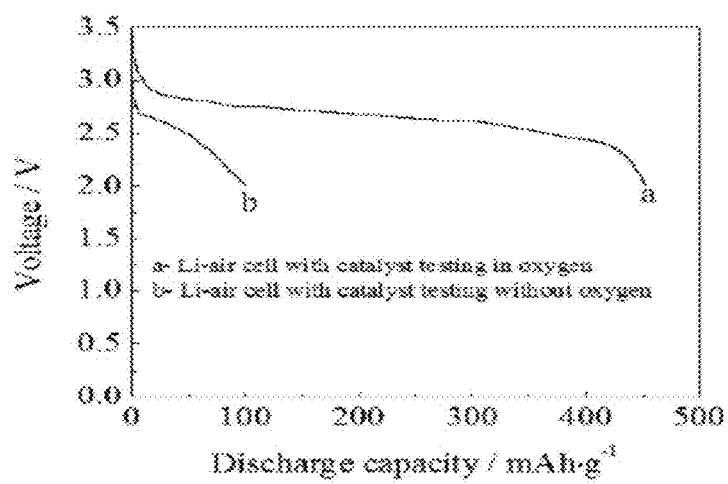
FIG. 12 illustrates discharge curves of Li-air cells with $Ag_2Mn_8O_{16}$ catalyst at a constant current density of 0.2 mA/cm$^2$ testing in oxygen and without oxygen.

FIG. 12 is a graph of discharge curves for a lithium-air cell with $Ag_2Mn_8O_{16}$ catalyst at a constant current density of 0.2 mA-cm$^{-2}$, with and without oxygen present. Since the cathode material of the lithium-air cell was carbon and $Ag_2Mn_8O_{16}$ catalyst, the condition of the cell is similar to that of Li ion battery, so it is necessary to identify the discharge capacity of the cell mainly coming from oxygen reduction, and not from the Li ion insertion into the cathode material. An identical cell was assembled and tested in an argon atmosphere at the same discharge current of 0.2 mA-cm$^{-2}$. The discharge behavior is shown in FIG. 12. Not only is the open circuit voltage lowered to 3.1 V but also the discharge time is reduced. The discharge capacity is only 100 mAh-g$^{-1}$. This result illustrates that the discharge capacity of the cell operated in oxygen atmosphere results from the reduction of molecular oxygen.

Figure 13:
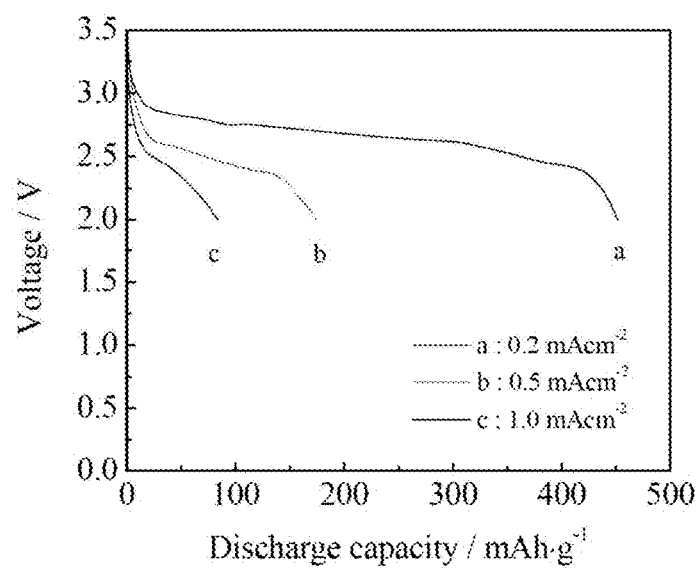
FIG. 13 illustrates discharge curves of Li-air cells with $Ag_2Mn_8O_{16}$ catalyst at a constant current density of 0.2, 0.5 and 1.0 mA/cm$^2$ testing within oxygen.

As can be seen from FIG. 13, the specific capacity of a lithium-air cell with $Ag_2Mn_8O_{16}$ catalyst is strongly dependent on the discharge current density. Lithium-air cells were discharged at constant current densities of 0.2, 0.5, and 1.0 mA-cm$^{-2}$ within oxygen. The discharge capacities of the lithium-air cells were 430, 200 and 100 mAh-g$^{-1}$, respectively. The discharge processes can be explained by an electrochemical reaction rate equation and the oxygen concentration inside the air electrode.

During the discharge of a lithium-air cell the electrochemical reduction of molecular oxygen takes place in Lt$^+$-containing electrolytes, and this electrochemical reaction proceeds in a stepwise fashion to form $O^2$, $O_2^{2-}$, and $O^{2-}$ as intermediates, which can further combine Li$^+$ to produce $LiO_2$, $Li_2O_2$ and $Li_2O$. The formation of intermediates involves the molecular oxygen acceptation of electrons, and the breakdown of O—O bond to form new chemical bonds, i.e., superoxide negative ions, peroxide negative ions and oxide negative ions. The lithium-air cell discharge proceeds in relation to three kind of polarizations, ohm polarization caused by electrode conductivity, concentration polarization produced by diffusion of reaction active species and product species, as well as electrochemical polarization generated by the electrochemical reaction rate. In lithium-air cells structured with/without $Ag_2Mn_8O_{16}$ catalyst, the concentration of cathode reaction active oxygen is the same, the concentration of product species can also be considered to be equal, and the concentration polarization can be therefore the same.

Without limiting the invention, it is believed that the improvement of discharge voltage (FIG. 13) can be ascribed to the decrease of ohm and electrochemical polarizations involved in discharge. Under the conditions of a lithium-air cell with a $Ag_2Mn_8O_{16}$ catalyst, the lattice of $Ag_2Mn_8O_{16}$, the $Mn^{3+}/Mn^{4+}$ atomic ratio is 2/6, the electron transfer between electrode and molecular oxygen can be carried out through the $Mn^{3+}/Mn^{4+}$ redox couple. On the other hand, the existence of silver also enhances electrode conductivity. Moreover, the O—O bond breakdown and intermediate species formation may become easier, and consequently leads to a high reaction rate, that is, the electrochemical polarization is decreased.

Increase in discharge capacity can be regarded as the different discharge products produced for lithium-air cells with/without $Ag_2Mn_8O_{16}$ catalyst. The discharge product of lithium-air cell has been considered as a mixture of lithium oxides. Indeed, the ratio of peroxide ($Li_2O_2$) and oxide ($Li_2O$) in discharge product mixture is unclear as yet. The density of these two kinds of oxide is different—the density of peroxide ($Li_2O_2$) and oxide ($Li_2O$) is 2.14 and 2.01 g-cm$^{-3}$. Under the same space of air electrode the smaller of the discharge product density, the more amount of product produced; and the discharge capacity is increased. Here, we consider that the combination of $Ag_2Mn_8O_{16}$ catalyst into the air electrode accelerated the oxygen reduction process, and changed the ratio of discharge products.

The $Ag_2Mn_8O_{16}$ catalysts have high catalytic activity. Batteries using these new catalysts will have high performance including high power density, high energy efficiency, and good cyclability.

While specific embodiments of the invention are discussed herein and are illustrated in the drawings appended hereto, the invention encompasses a broader spectrum than the specific subject matter described and illustrated. As would be appreciated by those skilled in the art, the embodiments described herein provide but a few examples of the broad scope of the invention. There is no intention to limit the scope of the technology only to the embodiments described herein.

What is claimed is:

1. A lithium air battery cell, comprising:
   an anode comprising lithium;
   a cathode comprising a $Ag_2Mn_8O_{16}$ catalyst and a carbon support wherein the loading of $Ag_2Mn_8O_{16}$ catalyst is between 5% and 75% based on the total weight of the cathode; and,
   an electrolyte comprising a lithium salt.

2. The lithium air battery cell of claim 1, wherein the cathode comprises at least one selected from the group consisting of single-wall carbon nanotubes, multi-wall carbon nanotubes, and carbon nanofibers.

3. The lithium air battery cell of claim 1, wherein the cathode comprises at least one selected from the group consisting of carbon black, carbon microbeads, and activated carbon.

4. The lithium air battery cell of claim 1, wherein the cathode comprises small and large diameter multi-wall nanotubes.

5. The lithium air battery cell of claim 4, wherein the cathode comprises an entanglement of flexible single-wall nanotubes and small diameter multi-wall nanotubes around nanofibers and the large diameter multi-wall nanotubes.

6. The lithium air battery cell of claim 1, wherein the $Ag_2Mn_8O_{16}$ particles are between 2-100nm in diameter.

7. The lithium air battery cell of claim 1, wherein the electrolyte comprises at least one selected from the group consisting of lithium hexafluorophosphate, lithium tetrafluoroborate, lithium hexafluoroarsenate, lithium perchlorate, lithium bis(trifluorosulfonyl) imide, lithium bis(perfluoroethylsulfonyl) imide, lithium triflate, lithium bis(oxalato) borate, lithium tris(pentafluoroethyl)trifluorphosphate, lithium bromide, and lithium iodide.

8. The lithium air battery cell of claim 1, wherein the electrolyte comprises at least one selected from the group consisting of propylene carbonate, ethylene carbonate, dimethyl carbonate, diethyl carbonate, ethylene carbonate, 1,2 dimethoxyethane, diethyl carbonate, ethyl methyl carbonate, gamma-butyrolactone, sulfolane, 1,3-dioxolane, tetrahydrofuran, dimethoxyethane, diglyme, tetraglyme, diethyl ether, 2-methyl tetrahydrofuran, tetrahydropyran, pyridine, n-methylpyrrolidone,dimethyl sulfone, ethyl methyl sulfone,ethyl acetate, dimethyl formamide, dimethyl sulfoxide, acetonitrile, and methyl formate.

9. The lithium battery of claim 1, wherein the anode lithium is at least one selected from the group consisting of from lithium metal, lithium powder, a lithium metal based alloy, a lithium intercalation compound and lithium titanate.

10. A cathode for a lithium air battery cell, comprising:
a cathode support comprising carbon;
a $Ag_2Mn_8O_{16}$ catalyst on the carbon support, wherein the loading of the $Ag_2Mn_8O_{16}$ catalyst is between 5% and 75% based on the total weight of the cathode.

11. A lithium air battery cell, comprising:
a cathode comprising buckypaper and a $Ag_2Mn_8O_{16}$ catalyst, wherein the loading of the $Ag_2Mn_8O_{16}$ catalyst is between 5% and 75% based on the total weight of the cathode;
an electrolyte comprising a lithium salt; and
an anode comprising lithium.

* * * * *